US00RE34247E

United States Patent [19]

Atal et al.

[11] E Patent Number: Re. 34,247

[45] Reissued Date of Patent: May 11, 1993

[54] DIGITAL SPEECH PROCESSOR USING ARBITRARY EXCITATION CODING

[75] Inventors: Bishnu S. Atal, New Providence, N.J.; Isabel M. Martins Trancoso, Lisbon, Portugal

[73] Assignee: AT&T Bell Laboratories, Murray Hill, N.J.

[21] Appl. No.: 694,583

[22] Filed: May 2, 1991

Related U.S. Patent Documents

Reissue of:

[64] Patent No.: 4,827,517
Issued: May 2, 1989
Appl. No.: 810,920
Filed: Dec. 26, 1985

[51] Int. Cl.[5] ..... G10L 1/00

[52] U.S. Cl. ..... 381/41; 381/49; 381/43; 381/51; 395/2

[58] Field of Search ..... 381/31, 32, 34, 35, 381/36, 40, 41, 42, 43, 46, 49, 51; 364/715, 723; 395/2

[56] References Cited

U.S. PATENT DOCUMENTS

| | | | |
|---|---|---|---|
| 3,588,460 | 6/1971 | Smith . | |
| 3,624,302 | 11/1971 | Atal . | |
| 3,740,476 | 6/1973 | Atal . | |
| 3,982,070 | 9/1976 | Flanagan | 381/51 |
| 4,022,974 | 5/1977 | Kohut et al. | 364/513.5 |
| 4,092,493 | 5/1978 | Rabiner et al. | 381/43 |
| 4,133,976 | 1/1979 | Atal et al. . | |
| 4,184,049 | 1/1980 | Crochiere et al. | 381/41 X |
| 4,354,057 | 10/1982 | Atal . | |
| 4,472,832 | 9/1984 | Atal et al. | 364/513.5 X |
| 4,701,954 | 10/1987 | Atal | 381/49 |

OTHER PUBLICATIONS

*Proceedings of the International Conference on Communications-ICC'84*, May 1984, "Stochastic Coding of Speech Signals at Very Low Bit Rates", by B. S. Atal and M. R. Schroeder, pp. 1610–1613.

*IEEE Transactions on Communications*, vol. COM-30, No. 4, Apr. 1982, "Predictive Coding of Speech at Low Bit Rates", by B. S. Atal, pp. 600–614.

*Introduction to Matrix Computations*, Academic Press, 1973, G. W. Stewart, pp. 317–320.

*IEEE Journal of Solid-State Circuits*, vol. SC-20, No. 5, Oct. 1985, "A 32-bit VLSI Digital Signal Processor", W. P. Hays et al, pp. 998–1004.

*MC68000 16 Bit Microprocessor User's Manual*, Second Edition, Motorola Inc., 1980.

*Primary Examiner*—Paul Ip
*Attorney, Agent, or Firm*—William Ryan

[57] ABSTRACT

An arrangement for processing a speech message which uses arbitrary value codes to form time frame excitation signals. The arbitrary value codes, e.g., random numbers, are stored as well as signals indexing the codes and transform domain signals corresponding to the arbitrary codes are generated. The speech message is partitioned into time frame interval speech patterns and a first signal representative of the transform domain speech pattern of each successive time frame interval is formed responsive to the partitioned speech message. A plurality of second signals representative of time frame interval patterns corresponding to the transform code signals are generated responsive to said set of transform signals. One of the arbitrary code signals is selected jointly responsive to the first and second signals of each successive time interval to represent the time frame speech signal excitation, and the index signal corresponding to said selected arbitrary code signal is output. A replica of the speech message is formed from the arbitrary codes by concatenating a sequence of said arbitrary codes identified by the output index signals.

23 Claims, 12 Drawing Sheets

DIGITAL SPEECH PROCESSOR USING ARBITRARY EXCITATION CODING

Matter enclosed in heavy brackets [ ] appears in the original patent but forms no part of this reissue specification; matter printed in italics indicates the additions made by reissue.

BACKGROUND OF THE INVENTION

The Government has rights in this invention pursuant to Contract No. MDA904-84-C-6010 awarded by Maryland Procurement Office.

Our invention relates to speech processing and more particularly to digital speech coding arrangements.

Digital speech communication systems including voice storage and voice response facilities utilize signal compression to reduce the bit rate needed for storage and/or transmission. As is well known in the art, a speech pattern contains redundancies that are not essential to its apparent quality. Removal of redundant components of the speech pattern significantly lowers the number of digital codes required to construct a replica of the speech. The subjective quality of the speech replica, however, is dependent on the compression and coding techniques.

One well known digital speech coding system such as disclosed in U.S. Pat. No. 3,624,302 issued Nov. 30, 1971 includes linear prediction analysis of an input speech signal. The speech signal is partitioned into successive intervals of 5 to 20 milliseconds duration and a set of parameters representative of the interval speech is generated. The parameter set includes linear prediction coefficient signals representative of the spectral envelope of the speech in the interval, and pitch and voicing signals corresponding to the speech excitation. These parameter signals may be encoded at a much lower bit rate than the speech signal waveform itself. A replica of the input speech signal is formed from the parameter signal codes by synthesis. The synthesizer arrangement generally comprises a model of the vocal tract in which the excitation pulses of each successive interval are modified by the interval spectral envelope representative prediction coefficients in an all pole predictive filter.

The foregoing pitch excited linear predictive coding is very efficient and reduces the coded bit rate, e.g., from 64 kb/s to 2.4 kb/s. The produced speech replica, however, exhibits a synthetic quality that makes speech difficult to understand. In general, the low speech quality results from the lack of correspondence between the speech pattern and the linear prediction model used. Errors in the pitch code or errors in determining whether a speech intervals is voiced or unvoiced cause the speech replica to sound disturbed or unnatural. Similar problems are also evident in formant coding of speech. Alternative coding arrangements in which the speech excitation is obtained from the residual after prediction, e.g., APC, provide a marked improvement because the excitation is not dependent upon an inexact model. The excitation bit rate of these systems, however, is at least an order of magnitude higher than the linear predictive model. Attempts to lower the excitation bit rate in the residual type systems have generally resulted in a substantial loss in quality.

The article "Stochastic Coding of Speech Signals at Very Low Bit Rates" by Bishnu S. Atal and Manfred Schroeder appearing in the Proceedings of the International Conference on Communications-ICC '84, May 1984, pp. 1610–1613, discloses a stochastic model for generating speech excitation signals in which a speech waveform is represented as a zero mean Gaussian stochastic process with slowly-varying power spectrum. The optimum Gaussian innovation sequence is obtained by comparing a speech waveform segment, typically 5 ms. in duration, to synthetic speech waveforms derived from a plurality of random Gaussian innovation sequences. The innovation sequence that minimizes a perceptual error criterion is selected to represent the segment speech waveform. While the stochastic model described in this article results in low bit rate coding of the speech waveform excitation signal, a large number of innovation sequences are needed to provide an adequate selection. The signal processing required to select the best innovation sequence involves exhaustive search procedures to encode the innovation signals, but such search arrangements for code bit rates corresponding to 4.8 Kbit/sec code generation are very time consuming even when processed onlarge, high speed scientific computers. It is an object of the invention to provide improved speech coding and synthesis of high quality at lower bit rates utilizing arbitrary codes.

SUMMARY OF THE INVENTION

The foregoing object is realized by replacing the exhaustive search of innovation sequence stochastic or other arbitrary codes of a speech analyzer with an arrangement that converts the stochastic codes into transform domain code signals and generates a set of transform domain patterns from the transform codes for each time frame interval. The transform domain code patterns are compared to the transfer of the time interval speech pattern obtained from the input speech to select the best matching stochastic code and an index signal corresponding to the best matching stochastic code is output to represent the time frame interval speech. Transform domain processing reduces the complexity and the time required for code selection.

The index signal is applied to a decoder in which it is used to select a stochastic code stored therein. In a predictive speech synthesizer, the stochatic codes may represent the time frame speech pattern excitation signal whereby the code bit rate is reduced to that required for the index signals and the prediction parameters of the time frame. The stochastic codes may be predetermined overlapping segments of a string of stochastic numbers to reduce storage requirements.

The invention is directed to an arrangement for processing a speech message in which a set of arbitrary value code signals such as random numbers together with index signals indentifying the arbitrary value code signals and signals representative of transforms of the arbitrary valued codes are formed. The speech message is partitioned into time frame interval speech patterns and a first signal representative of the speech pattern of each successive time frame interval is formed responsive to the partitioned speech. A plurality of second signals representative of time frame interval patterns formed from the transform domain code signals are generated. One of said artirary code signals is selected for each time frame interval jointly responsive to the first signal and the second signals of the time frame interval and the index signal corresponding to said selected transform signal is output.

According to one aspect of the invention, forming of the first signal includes generating a third signal that is a transform domain signal corresponding to the current time frame interval speech pattern and the generation of each second signal includes producing a fourth signal that is a transform domain signal corresponding to a time frame interval pattern responsive to said transform domain code signals. Arbitrary code selection comprises generating a signal representative of the similarities between said third and fourth signals and determining the index signal corresponding to the fourth signal having the maximum similarities signal.

According to another aspect of the invention, the transform domain code signals are frequency domain transform codes derived from the arbitrary codes.

According to yet another aspect of the invention, the transform domain code signals are Fourier transforms of the arbitrary codes.

According to yet another aspect of the invention, a speech message is formed from the arbitrary codes by receiving a sequence of said outputted index signals, each identifying a predetermined arbitrary code. Each index signal corresponds to a time frame interval speech pattern. The arbitrary codes are concatenated responsive to the sequence of said received index signals and the speech message is formed responsive to the concatenated codes.

According to yet another aspect of the invention, a speech message is formed using a string of arbitrary value coded signals having predetermined segments thereof identified by index signals. A sequence of signals identifying predetermined segments of said string are received. Each of said signals of the sequence corresponds to speech patterns of successive time frame intervals. The predetermined segments of said arbitrary value code string are selected responsive to the sequence of received identifying signals and the selected arbitrary codes are concatenated to generate a replica of the speech message.

According to yet another aspect of the invention, the arbitrary value signal sequences of the string are overlapping sequences.

GENERAL DESCRIPTION

Figure 1:
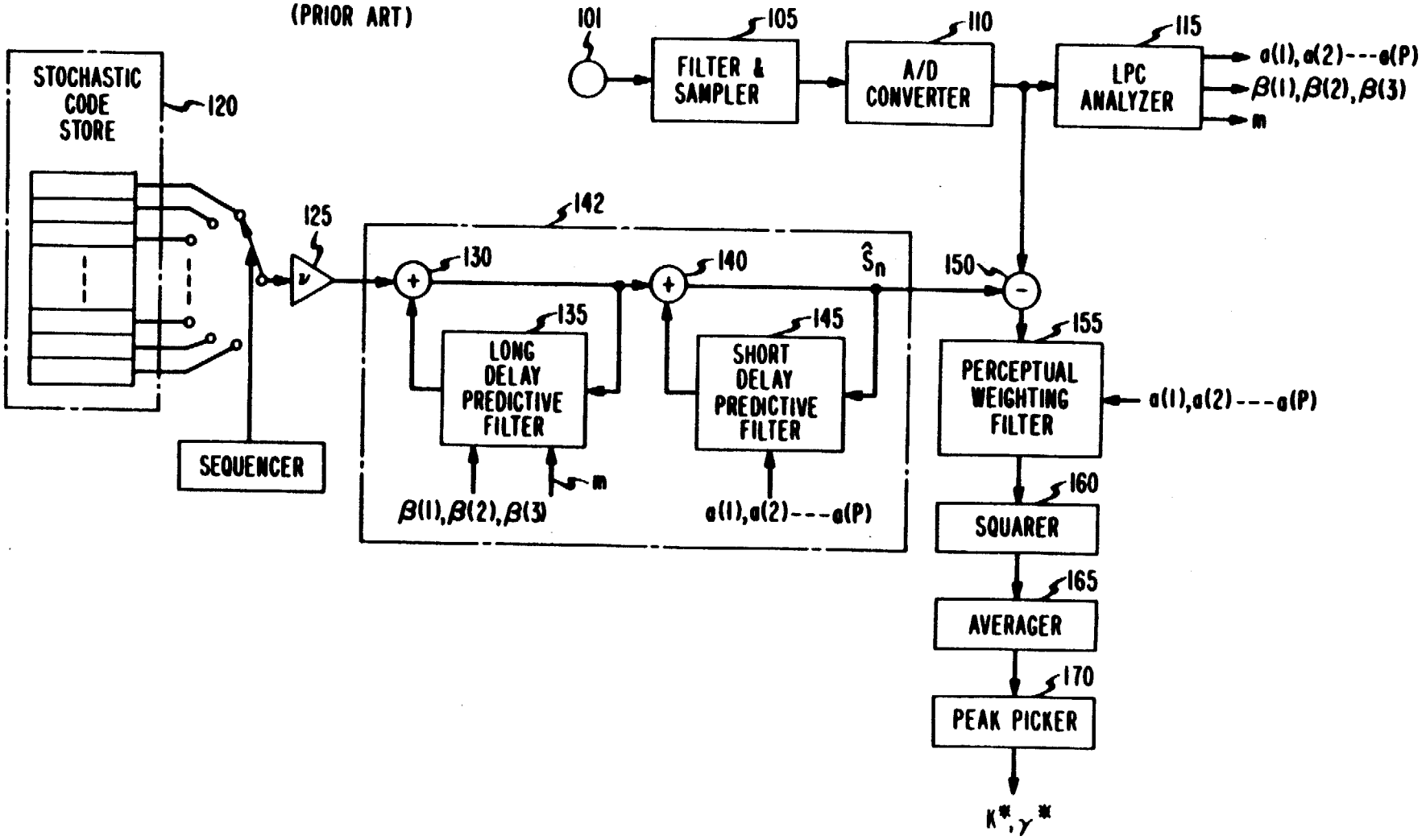
FIG. 1 (PRIOR ART)
FIG. 1 depicts a speech encoder utilizing a prior art stochastic coding arrangement.

FIG. 1 shows a prior art digital speech coder arranged to use stochastic codes for excitaion signals. Referring to FIG. 1, a speech pattern applied to microphone 101 is converted therein to a speech signal which is band pass filtered and sampled in filter and sampler 105 as is well known in the art. The resulting samples are converted into digital codes by analog-to-digital converter 110 to produce digitally coded speech signal s(n). Signal s(n) is processed in LPC and pitch predictive analyzer 115. The processing includes dividing the coded samples into successive speech frame intervals and producing a set of parameter signals corresponding to the signal s(n) in each successive frame. Parameter signals a(1), a(2), . . . a(p) represent the short delay correlation or spectral related features of the interval speech pattern, and parameter signals $\beta(1)$, $\beta(2)$, $\beta(3)$, and m represent long delay correlation or pitch related features of the speech pattern. In this type of coder, the speech signal is partitioned in frames or blocks, e.g., 5 msec or 40 samples in duration. For such blocks, stochastic code store 120 may contain 1024 random white Gaussian codeword sequences, each sequence comprising a series of 40 random numbers. Each codeword is scaled in scaler 125, prior to filtering, by a factor $\gamma$ that is constant for the 5 msec block. The speech adaptation is done in recursive filters 135 and 145.

Filter 135 uses a predictor with large memory (2 to 15 msec) to introduce voice periodicity and filter 145 uses a predictor with short memory (less than 2 msec) to introduce the spectral envelope in the synthetic speech signal. Such filters are described in the article "Predictive coding of speech at low bit rates" by B. S. Atal appearing in the IEEE Transactions on Communications, Vol. COM-30, pp. 600–614, April 1982. The error representing the difference between the original speech signal s(n) applied to differencer 150 and synthetic speech signal s(n) applied from filter 145 is further processed by linear filter 155 to attenuate those frequency components where the error is perceptually less important and amplify those frequency components where the error is perceptually more important. The stochastic code sequence from store 120 which produces the minimum mean-squared subjective error signal E(k) and the corresponding optimum scale factor $\gamma$ are selected by peak picker 170 only after processing of all 1024 code word sequences in store 120.

For purposes of analyzing the codeword processing of the circuit of FIG. 1, synthesis filters 135 and 145 and perceptual weighting filter 155 can be combined into one linear filter. The impulse response of this equivalent filter may be represented by the sequence f(n). Only a part of the equivalent filter output is determined by its input in the current 5 msec frame since, as is well known in the art, a portion of the filter output corresponds to signals carried over from preceding frames. The filter memory from the previous frames plays no role in the search for the optimum innovation sequence in the present frame. The contributions of the previous memory to the filter output in the present frame can thus be subtracted from the speech signal in determining the optimum code word from stochastic code stoe 120. The residual after subtracting the contributions of the filter memory carried over from the previous frames may be represented by the signal x(n). The filter output contributed by the kth codeword from store 120 in the present frame is $$\bar{x}^{(k)}(n) = \gamma(k) \sum_{i=1}^{N} f(n-i)c^{(k)}(i)$$

where $c^{(k)}(i)$ is the ith sample of the kth codeword. One can rewrite equation 1 in matrix notations as $$t(k)=\gamma(k)Fc(k),$$

where F is a $N\times N$ matrix with the term in the nth row and the ith column given by $f(n-i)$. The total squared error E(k), representing the difference between x(n) and $\bar{x}^{(k)}(n)$, is given by $$E(k)=\|x-\gamma(k)Fc(k)\|^2, \tag{3}$$

where the vector x represents the signal x(n) in vector notations, and $\|\ \|^2$ indicates the sum of the squares of the vector components. The optimum scale factor $\gamma(k)$ that minimizes the error E(k) can easily be determined by setting $\partial E(k)/\partial\gamma(k)=0$ and this leads to $$\gamma(k)=\frac{(x^tFc(k))}{\|Fc(k)\|^2} \tag{4}$$

and $$E(k)=\|x\|^2-\frac{(x^tFc(k))^2}{\|Fc(k)\|^2}. \tag{5}$$

The optimum codeword is obtained by finding the minimum of E(k) or the maximum of the second term on the right side in equation 5.

While the signal processing described with respect to FIG. 1 is relatively straight forward, the generation of the 1024 error signals E(k) of equation 5 is a time consuming operation that cannot be accomplished in real time in currently known high speed, large scale computers. The complexity of the search processing in FIG. 1 is due to the presence of the convolution operation represented by the matrix F in the error. The complexity is substantially reduced if the matrix F is replaced by a diagonal matrix. This is accomplished by representing the matrix F in the orthogonal form using singular-value decomposition as described in "Introduction to Matrix Computations" by G. W. Stewart, Academic Press, pp. 317-320, 1973. Assume that $$F=UDV^t, \tag{6}$$

where U and V are orthogonal matrices, D is a diagonal matrix with positive elements and $V^t$ indicates the transpose of V. Because of the orthogonality of U, equation 3 can be written as $$E(k)=\|U^t(x-\gamma(k)Fc(k)\|^2. \tag{7}$$

If we now replace F by its orthogonal form as expressed in equation 6, we obtain $$E(k)=\|U^tx-\gamma(k)DV^tc(k)\|^2. \tag{8}$$

On substituting $$z=U^tx$$

and $$b(k)=V^tc(k), \tag{9}$$

in equation 8, we obtain $$E(k)=\|z-\gamma(k)Db(k)\|^2=\sum_{i=1}^{N}[z(n)-\gamma(k)d(n)b^{(k)}(n)]^2. \tag{10}$$

As before, the optimum $\gamma(k)$ that minimizes E(k) can be determined by setting $\partial E(k)/\partial\gamma(k)=0$ and equation 10 simplifies to $$E(k)=\sum_{n=1}^{N}z(n)^2-\frac{\left[\sum_{n=1}^{N}z(n)d(n)b^{(k)}(n)\right]^2}{\sum_{n=1}^{N}[d(n)b^{(k)}(n)]^2}. \tag{11}$$

The error signal expressed in equation 11 can be processed much faster than the expression in equation 5. If Fc(k) is processed in a recursive filter of order p (typically 20), processing according to equation 11 can be substantially reduce the processing time requirements for stochastic coding.

Alternatively, the reduced processing time may also be obtained by extending the operations of equation 5 from the time domain to a transform domain such as the frequency domain. If the combined impulse response of the synthesis filter with the long-delay prediction excluded and the perceptual weighting filter is represented by the sequence h(n), the filter output contributed by the kth codeword in the present frame can be expressed as a convolution between its input $\gamma(k)c^{(k)}(n)$ and the impulse response h(n). The filter output is given by $$\bar{x}^{(k)}(n)=\gamma(k)h(n)*c^{(k)}(n) \tag{12}$$

The filter output can be expressed in the frequency domain as $$\bar{X}^{(k)}(i)=\gamma(k)H(i)C^{(k)}(i), \tag{13}$$

where $\bar{X}^{(k)}(i)$, H(i) and $C^{(k)}(i)$ are discrete Fourier transforms (DFTs) of $x^{(k)}(n)$, h(n) and $c^{(k)}(n)$, respectively. In practice, the duration of the filter output can be considered to be limited to a 10 msec time interval and zero outside. Thus a DFT with 80 points is sufficiently accurate for expressing equation 13. The total squared error E(k) is expressed in frequency-domain notations as $$E(k)=\sum_{i=1}^{40}|X(i)-\gamma(k)H(i)C^{(k)}(i)|^2, \tag{14}$$

where X(i) is the DFT of x(n). If we express now $$H(i)=d(i)e^{j\phi i}, \tag{15}$$

and $$\xi_i=X(i)e^{-j\phi i}, \tag{16}$$

equation 14 is then transformed to $$E(k)=\sum_{i=1}^{40}|\xi(i)-\gamma_k d(i)C^{(k)}(i)|^2. \tag{17}$$

Again, the scale factor $\gamma(k)$ can be eliminated from equation 17 and the total error can be expressed as $$E(k) = \sum_{i=1}^{40} |X(i)|^2 - \frac{\left(\text{Real} \sum_{i=1}^{40} \xi(i)^* d(i) C^{(k)}(i)\right)^2}{\sum_{i=1}^{40} |d(i) C^{(k)}(i)|^2}. \quad (18)$$

where $\xi(i)^*$ is complex conjugate $\xi(i)$. The frequency-domain search has the advantage that the singular-value decomposition of the matrix F is replaced by discrete fast Fourier transforms whereby the overall processing complexity is significantly reduced. In the transform domain using either the singular value decomposition or the discrete Fourier transform processing, further savings in the computational load can be achieved by restricting the search to a subset of frequencies (or eigenvectors) corresponding to large values of d(i) (or b(i)). According to the invention, the processing is substantially reduced whereby real time operation with microprocessor integrated circuits is realizable. This is accomplished by replacing the time domain processing involved in the generation of the error between the synthetic speech signal formed responsive to the innovation code and the input speech signal of FIG. 1 with transform domain processing as described hereinbefore.

DETAILED DESCRIPTION

Figure 2:
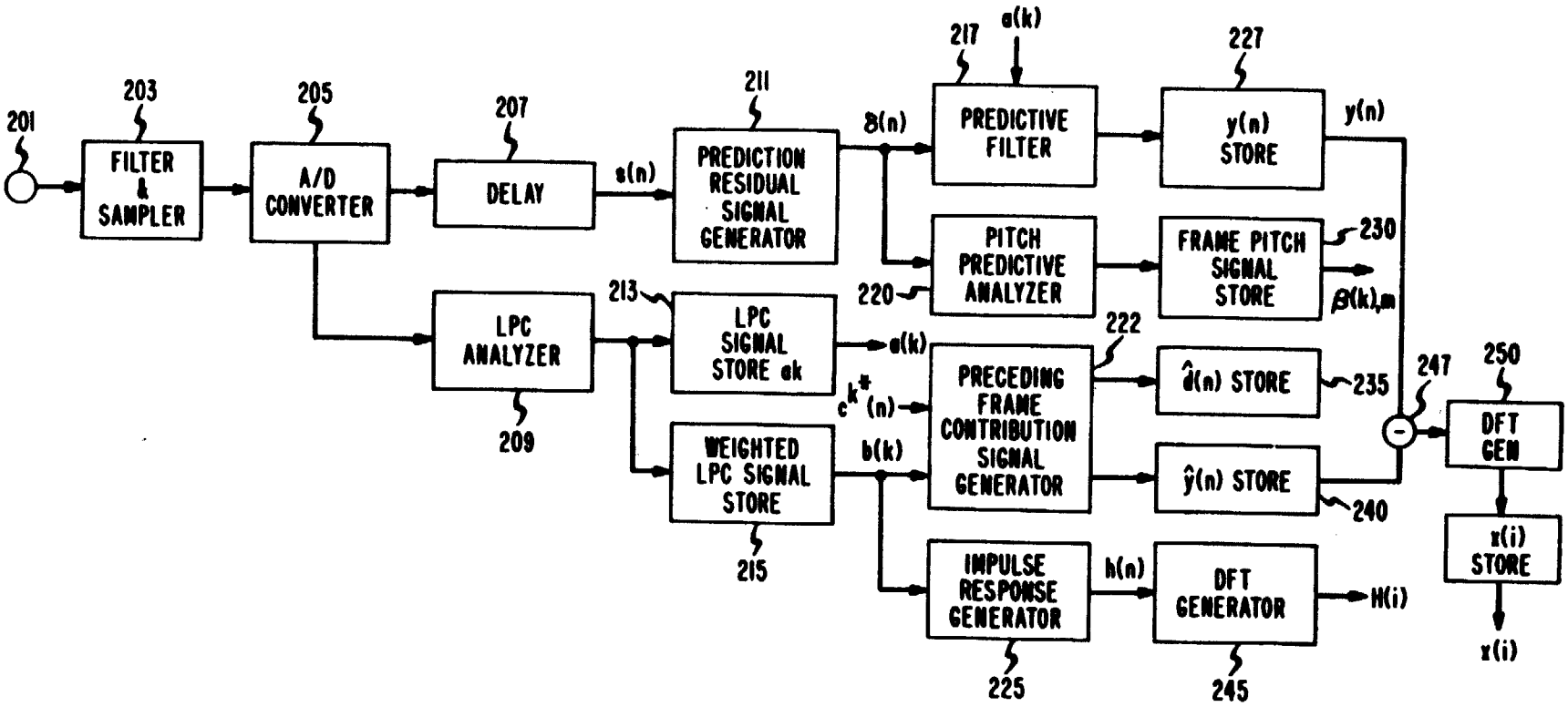
FIGS. 2 and 3 depict a general block diagram of a digital speech encoder usin arbitrary codes and transform domain processing that is illustrative of the invention.
Figure 3:
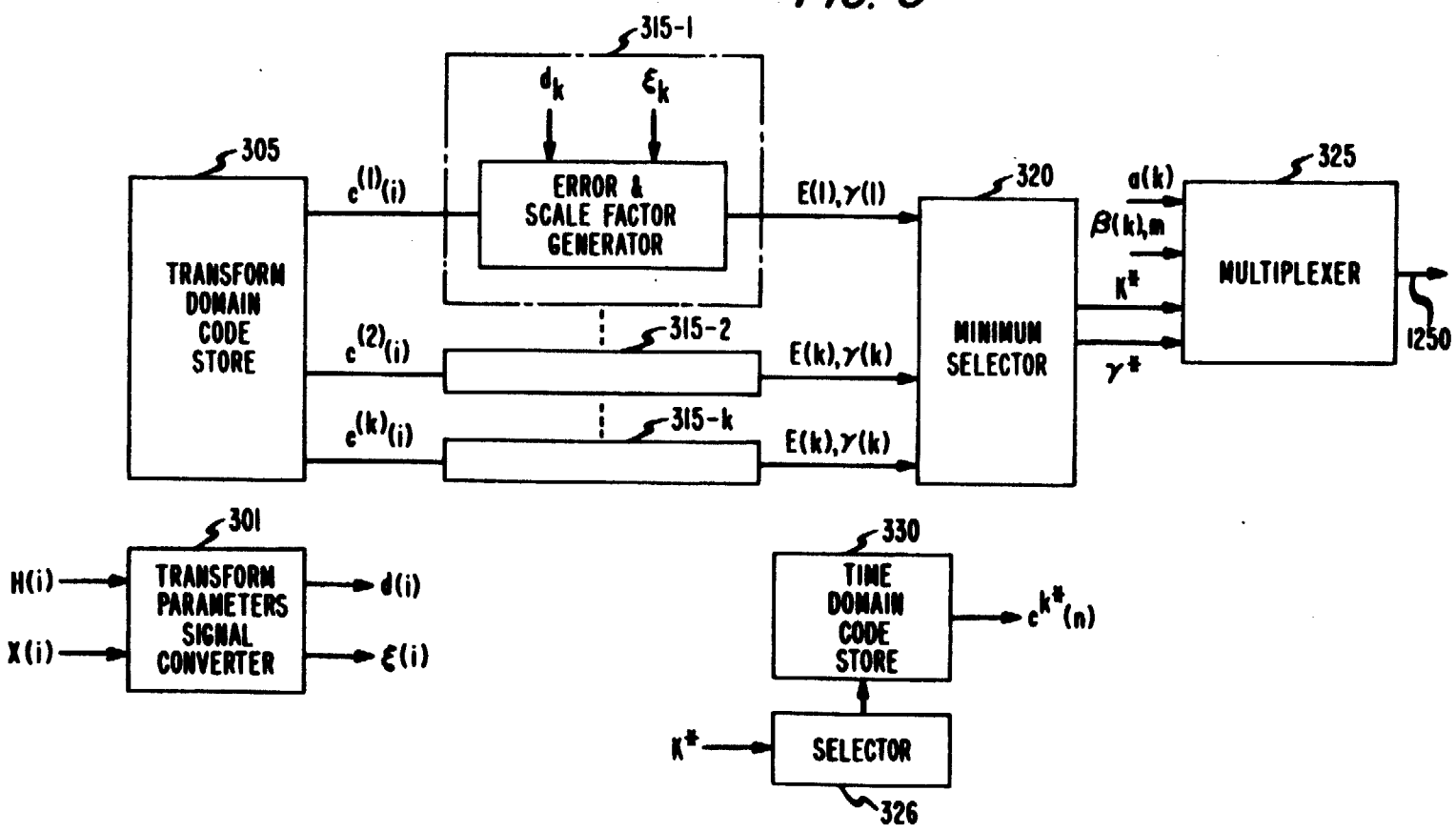

A transform domain digital speech encoder using arbitrary codes for excitation for excitation signals illustrative of the invention is shown in FIGS. 2 and 3. The arbitrary codes may take the form of random number sequences or may, for example, be varied sequences of +1 and −1 in any order. Any arrangement of varied sequences may be used with the broad restriction that the overall average of the sequences is small. Referring to FIG. 2, a speech pattern such as a spoken message received by microphone transducer 201 is bandlimited and converted into a sequence of pulse samples in filter and sampler circuit 203 and supplied to linear prediction coefficient (LPC) analyzer 209 via analog-to-digital converter 205. The filtering may be arranged to remove frequency components of the speech signal above 4.0 KHz, and the sampling may be at an 8.0 KHz rate as is well known in the art. Each sample from circuit 203 is transformed into an amplitude representative digital code in the analog-to-digital converter. The sequence of digitally coded speech samples is supplied to LPC analyzer 209 which is operative, as is well known in the art, to partition the speech signals into 5 to 20 ms time frame intervals and to generate a set of linear prediction coefficient signals a(k), k=1, 2, . . . , p representative of the predicted short time spectrum of the speech samples of each frame. The analyzer also forms a set of perceptually weighted linear predictive coefficient signals $$b(k) = ka(k), \quad k = 1, 2, \ldots p, \quad (19)$$

where p is the number of the prediction coefficients.

The speech samples from A/D converter 205 are delayed in delay 207 to allow time for the formation of speech parameter signals a(k) and the delayed samples are supplied to the input of prediction residual generator 211. The prediction residual generator, as is well known in the art, is responsive to the delayed speech samples s(n) and the prediction parameters a(k) to form a signal ∂(n) corresponding to the differences between speech samples and their predicted values. The formation of the predictive parameters and the prediction residual signal for each frame in predictive analyzer 209 may be performed according to the arrangement disclosed in U.S. Pat. No. 3,740,476 issued to B. S. Atal, June 19, 1973, and assigned to the same assignee, or in other arrangements well known in the art.

Prediction residual signal generator 211 is operative to subtract the predictable portion of the frame signal from the sample signals s(n) to form signal ∂(n) in accordance with $$\delta(n) = s(n) - \sum_{k=1}^{p} s(n-k)a(k), \; n = 1, 2, \ldots, N. \quad (20)$$

where p, the number of the predictive coefficients, may be 12, N the number of samples in a speech frame, may be 40, and a(k) are the predictive coefficients of the frame. Predictive residual signal ∂(n) corresponds to the speech signal of the frame with the short term redundancies removed. Longer term redundancy of the order of several speech frames in the predictive residual signal remains and predictive parameters $\beta(1)$, $\beta(2)$, $\beta(3)$ and m corresponding to such longer term redundancy are generated in predictive pitch analyzer 220 such that m is an integer that maximizes $$\frac{\sum_{n=1}^{N} \delta(n)\delta(n-m)}{\left[\sum_{n=1}^{N} \delta^2(n) \sum_{n=1}^{N} \delta^2(n-m)\right]^2}, \quad (21)$$

and $\beta(1)$, $\beta(2)$, $\beta(3)$ minimize $$\sum_{n=1}^{N} [\delta(n) - \beta(1)\delta(n-m+1) - \beta(2)\delta(n-m) - \beta(3)\delta(n-m-1)]^2 \quad (22)$$

as described in U.S. Pat. No. 4,354,057 issued to B. S. Atal et al on Jan. 9, 1979. As is well known, digital speech encoders may be formed by encoding the predictive parameters of each successive frame, and the frame predictive residual for transmission to decoder appratus or for storage for later retrieval. While the bit rate for encoding the predictive parameters is relatively low, the non-redundant nature of the residual requires a very high bit rate. According to the invention, an optimum arbitrary code $$c_{(n)}^{K^*}$$

is selected to represent the frame excitation, and a signal K* that indexes the selected arbitrary excitation code is transmitted. In this way, the speech code bit rate is minimized without adversely affecting intelligibility. The arbitrary code is selected in the transform domain to reduce the selection processing so that it can be performed in real time with microprocessor components.

Selection of the arbitrary code for excitation includes combining the predictive residual with the perceptually weighted linear predictive parameters of the frame to generate a signal y(n). Speech pattern signal y(n) corresponding to the perceptually weighted speech signal contains a component y(n) due to the preceding frames. This preceding frame component y(n) is removed prior to the selection processing so that the stored arbitrary codes are in effect compared to only the current frame excitation. Signal y(n) is formed in predictive filter 217 responsive to the perceptually weighted predictive parameter and the predictive residual signals of the frame as per the relation $$y(n) = \delta(n) + \sum_{k=1}^{p} y(n-k)b(k) \tag{23}$$

and are stoed in y(n) store 227.

The preceding frame speech contribution signal y(n) is generated in preceding frame contribution signal generator 222 from the perceptually weighted predictive parameter signal b(k) of the current frame, the pitch predictive parameters $\beta(1)$, $\beta(2)$, $\beta(3)$ and m obtained from store 230 and the selected $$d(n) = \beta(1)\bar{d}(n-m-1) + \beta(2)\bar{d}(n-m) + \beta(3)d(n-m+1) \tag{24a}$$

and $$\bar{y}(n) = \bar{d}(n) + \sum_{k=1}^{p} b(k)\bar{y}(n-k),\ n = 1, \ldots, N \tag{24b}$$

where $\bar{d}(1)$, $1 \leqq 0$ and $\bar{y}(1)$, $1 \leqq 0$ represent the past frame components. Generator 222 may comprise well known processor arrangements adapted to form the signals of equations 24. The past frame speech contribution signal y(n) of store 240 is subtracted from the perceptually weighted signal of store 227 in subtractor circut 247 to form the current frame speech pattern signal with past frame components removed.

$$x(n) = y(n) - y(n) \quad n = 1, 2, \ldots, N \tag{25}$$

The difference signal x(n) from subtractor 247 is then transformed into a frequency domain signal set by discrete Fourier transform (DFT) generator 250 as follows.

$$X(i) = \sum_{n=1}^{N} x(n)e^{-j\frac{2\pi}{Nf}(n-1)(i-1)} \quad i = 1, \ldots, N_f \tag{26}$$

where $N_f$ is the number of DFT points, e.g., 80. The DFT transformation generator may operate as described in the U.S. Pat. No. 3,588,460 issued to Richard A. Smith, June 28, 1971, and assigned to the same assignee, or may comprise any of the well known discrete Fourier transform circuits.

In order to select one of a plurality of arbitrary excitation codes for the current speech frame, it is necessary to take into account the effects of a perceptually weighted LPC filter on the excitation codes. This is done by forming a signal in accordance with $$h(n) = \sum_{k=1}^{p} h(n-k)b(k),\ n = 1, \ldots, N \tag{27}$$

$$h(k) = 1,\ d = 0,$$
$$h(k) = 0,\ d < 0,$$

that represents the impulse response of the filter and converting the impulse response to a frequency domain signal by a discrete Fourier transformation as per $$H(i) = \sum_{n=1}^{N} h(n)e^{-j\frac{2\pi}{Nf}(n-1)(i-1)} \quad i = 1, \ldots, N_f. \tag{28}$$

The perceptually weighted impulse response signal h(n) is formed in impulse response generator 225, and the transformation into the frequency domain signal H(i) is performed in DFT generator 245.

The frequency domain impulse response signal H(i) and the frequency domain perceptually weighted speech signal with preceding frame contributions removed X(i) are applied to transform parameter signal converter 301 in FIG. 3 wherein the signals d(i) and $\xi(i)$ are formed according to $$d(i) = |H(i)| \tag{29}$$

$$\xi(i) = X(i)\frac{H(i)}{d(i)}.$$

The arbitrary codes, to which the current speech frame excitation signals represented by d(i) and $\xi(i)$ are compared, are stored in stochastic code store 330. Each code comprises a sequence of N, e.g., 40, digital coded signals $c^{(k)}(1), c^{(k)}(2), \ldots, c^{(k)}(40)$. These signals may be a set of arbitrary selected numbers within the broad restriction that the grand average is relatively small, or may be randomly selected digitally coded signals but may also be in the form of other codes well known in the art consistent with this restriction. The set of signals $$c^{(k)}_{(n)}$$

may comprise individual codes that are overlapped to minimize storage requirements without affecting the encoding arrangements of FIGS. 2 and 3. Transform domain code store 305 contains the Fourier transformed frequency domain versions of the codes in store 330 obtained by the relation $$C^{(k)}(i) = \sum_{h=1}^{N} c^{(k)}(n)e^{-j\frac{2\pi}{Nf}(n-1)(i-1)}. \tag{30}$$

While the transform code signals are stored, it is to be understood that other arrangements well known in the art which generate the transform signals from stored arbitrary codes may be used. Since the frequency domain codes have real and imaginary component signals, there are twice as many elements in the frequency domain code $C^{(k)}(i)$ as there are in the corresponding time domain code $$c^{(k)}_{(n)}.$$

Figure 5:
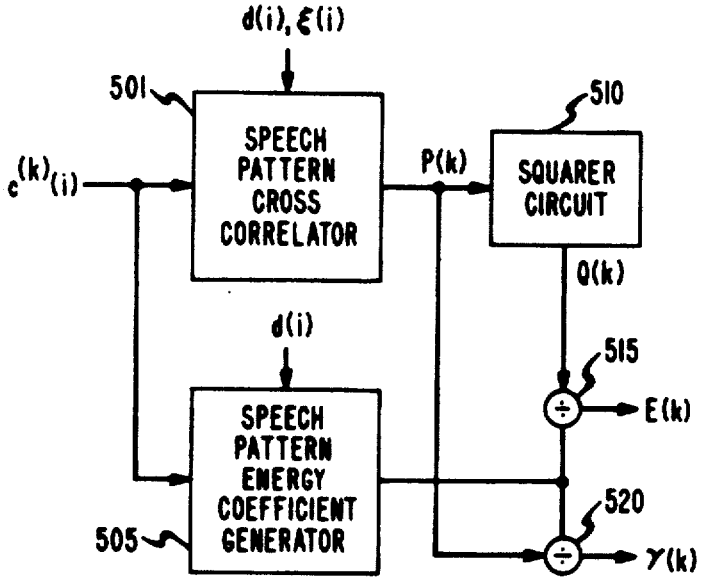
FIG. 5 shows a block diagram of an error and scale factor generating circuit useful in the arrangement of FIG. 3.

Each code output $C^{(k)}(i)$ of transform domain code store 305 is applied to one of the K error and scale factor generators 315-1 through 315-K wherein the transformed arbitrary code is compared to the time frame speech signal represented by signals d(i) and $\xi(i)$ for the time frame obtained from parameter signal converter 301. FIG. 5 shows a block diagram arrangement that may be used to produce the error and scale factor signals for error and scale factor generator 315-K. Referring to FIG. 5, arbitrary code sequence $C^{(k)}(1)$, $C^{(k)}(2), \ldots, C^{(k)}(i), \ldots, C^{(k)}N$ is applied to speech pattern cross correlator 501 and speech pattern energy coefficient generator 505 which serves as a normalizer. Signal d(i) from transform parameter signal converter 301 is supplied to cross correlator 501 and normalizer 505, while $\xi(i)$ from converter 301 is supplied to cross correlator 501. Cross correlator 501 is operative to generate the signal $$P(k) = \text{Real}\left[\sum_{i=1}^{N} \xi^*(i)d(i)C^{(k)}(i)\right] \tag{31}$$

which represents the correlation of the speech frame signal with past frame components removed $\xi(i)$ and he frame speech signal derived from the transformed arbitrary code d(i) $C^k(i)$ while squarer circuit 510 produces the signal $$Q(k) = \sum_{i=1}^{N} |d(i)C^{(k)}(i)|^2 \tag{32}$$

The error using code sequence $$c^k_{(n)}$$

is formed in divider circuit 515 responsive to the outputs of cross correlator 501 and normalizer 505 over the current speech time frame according to $$E(k) = \frac{p^2(k)}{Q(k)}, \tag{33}$$

and the scale factor is produced in divider 520 responsive to the outputs of cross correlator circuit 510 and normalizer 505 as per $$\gamma(k) = \frac{P(k)}{Q(k)}. \tag{34}$$

The cross correlator, normalizer and divide circuits of FIG. 5 may comprise well known logic circuit components or may be combined into a digital signal processor as described hereinafter. The arbitrary code that best matches the characteristics of the current frame speech pattern is selected in code selector 320 of FIG. 3, and the index of the selected code K* as well as the scale factor for the code $\gamma(K^*)$ are supplied to multiplexer 325. The multiplexer is adapted to combine the excitation code signals K* and $\gamma(K^*)$ with the current speech time frame LPC parameter signals a(k) and pitch parameter signals $\beta(1)$, $\beta(2)$, $\beta(3)$ and m into a form suitable for transmission or storage. Index signal K* is also applied to selector 326 so that the time domain code for the index is selected from store 330. The selected time domain code $$c^{K^*}_{(n)}$$

is fed to preceding frame contribution generator 222 in FIG. 2 where it is used in the formation of the signal y(n) for the next speech time frme processing.

$$\left[\bar{d}(n) = \gamma^* c_n{}^k(n) + \beta(1)\bar{d}(n-m-1) + \beta(2)\bar{d}(n-m) + \right. \tag{35}$$

-continued $$\left.\beta(3)\bar{d}(n-m+1)\bar{y}(n) = d(n) + \sum_{k-1}^{p} \bar{y}(n-k)b(k)\right]$$

Figure 4:
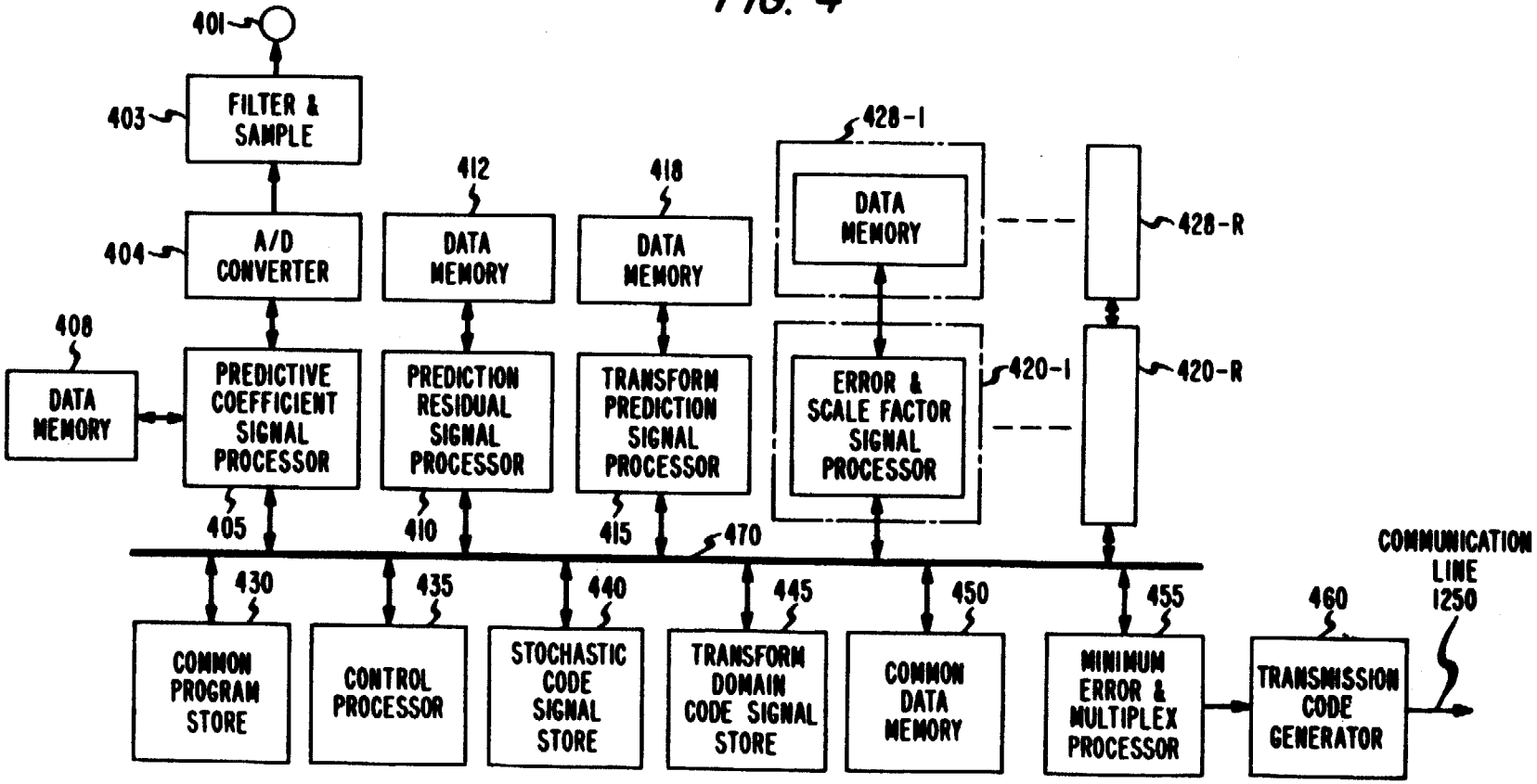
FIG. 4 depicts a detailed block diagram of digital speech encoding signal processing arrangement that performs the functions of the circuit shown in FIGS. 2 and 3.

FIG. 4 depicts a speech encoding arrangement according to the invention wherein the operations described with respect to FIGS. 2 and 3 are performed in a series of digital signal processors 405, 410, 415, and 420-1 through 420-K under control of control processor 435. Processor 405 is adapted to perform the predictive coefficient signal processing associated with LPC analyzer 209, LPC and weighted LPC signal stores 213 and 215, prediction residual signal generator 217, and pitch predictive analyzer 220 of FIG. 2. Predictive residual signal processor 410 performs the functions described with respect to predictive filter 217, preceding frame contribution signal generator 222, subtractor 247 and impulse response generator 225. Transform signal processor 415 carries out the operations of DFT generators 245 and 250 of FIG. 2 and transform parameter signal converter 301 of FIG. 3. Processors 420-1 and through 420-K produce the error and scale factor signals as would be obtained from error and scale factor generators 315-1 through 315-K of FIG. 3.

Each of the digital signal processors may be the WE ®DSP32 Digital Signal Processor described in the article "A 32 Bit VLSI Digital Signal Processor", by P. Hays et al, appearing in the IEEE Journal of Solid State Circuits, Vol. SC20, No. 5, pp. 998, October 1985, and the control processor may be the Motorola type 68000 microprocessor and associated circuits described in the publication "MC68000 16 Bit Microprocessor User's Manual", Second Edition, Motorola Inc., 1980. Each of the digital signal processors has associated therewith a memory for storing data for its operation, e.g., data memory 408 connected to prediction coefficient signal processor 405. Common data memory 450 stores signals from one digital signal processor that are needed for the operation of another signal processor. Common program store 430 has therein a sequence of permanently stored instruction signals used by control processor 435 and the digital signal processors to time and carry out the encoding functions of FIG. 4. Stochastic code store 440 is a read only memory that includes random codes $C^k(n)$ as described with respect to FIG. 3 and transform code signal store 445 is another read only memory that holds the Fourier transformed frequency domain code signals corresponding to the codes in store 440.

Figure 6:
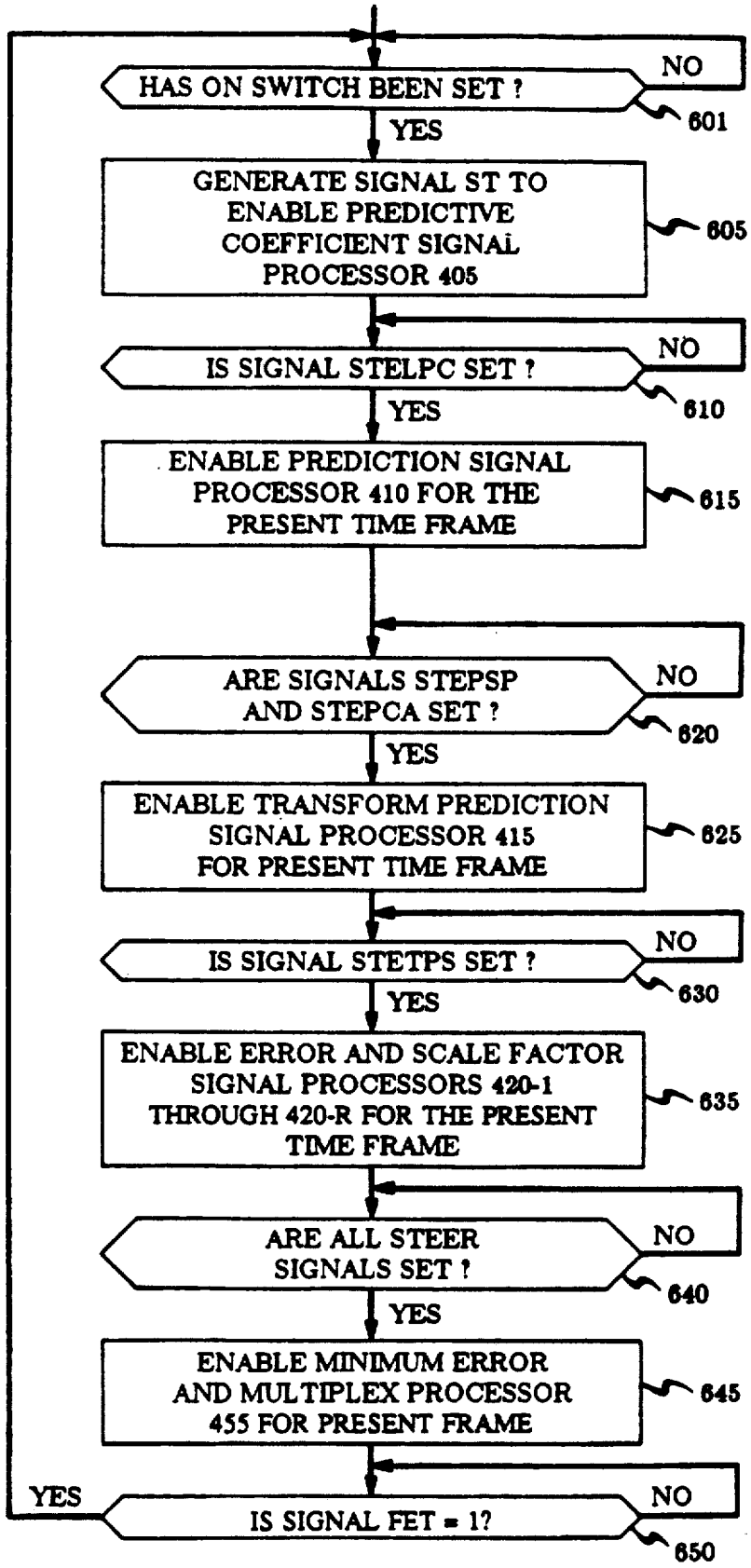
FIGS. 6–11 show flow chart diagrams that illustrate the operation of the circuit of FIG. 4.
Figure 7:
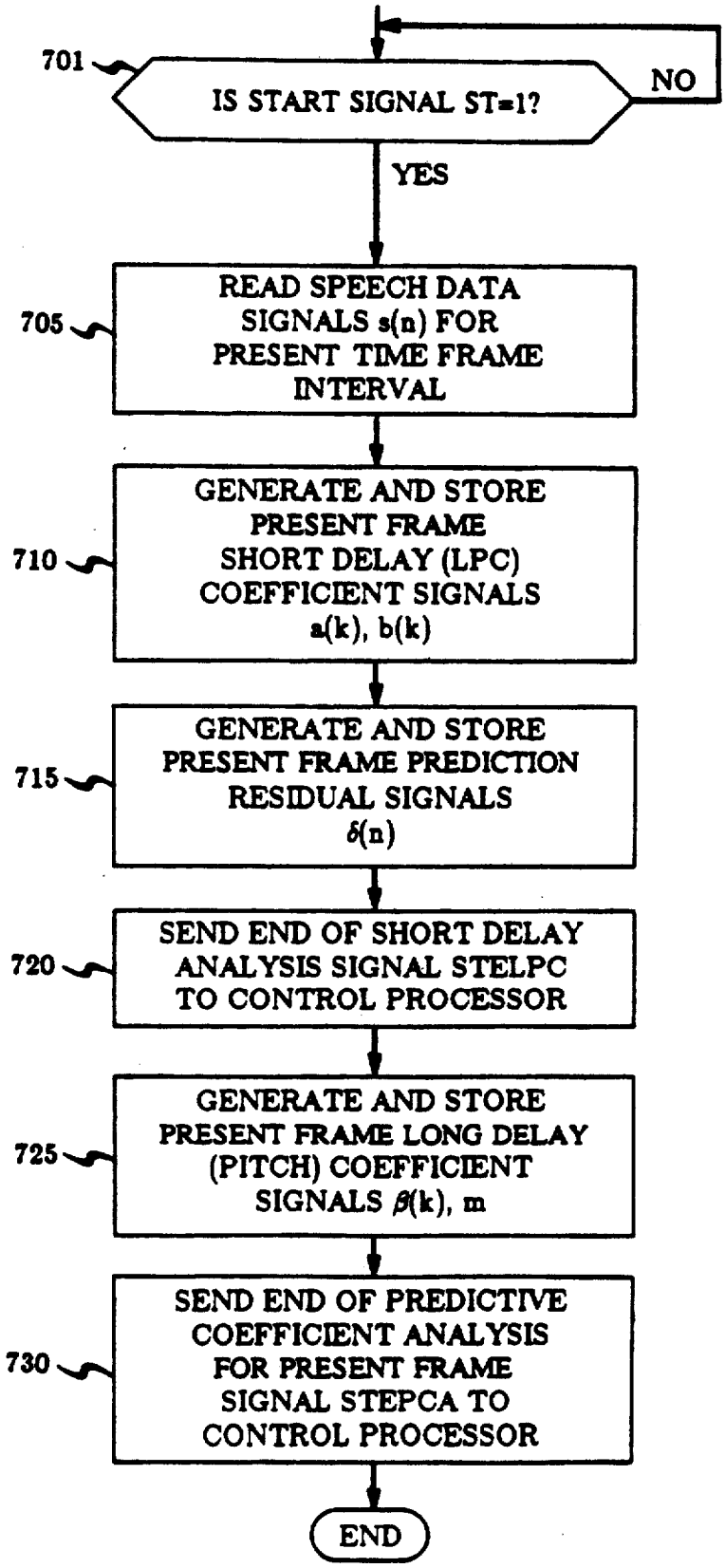

The encoder of FIG. 4 may form a part of a communication system in which speech applied to microphone 401 is encoded to a low bit rate digital signal, e.g., 4.8 kb/s, and transmitted via a communication link to a receiver adapted to decode the arbitrary code indices and frame parameter signals. Alternatively, the output of the encoder of FIG. 4 may be stored for later decoding in a store and forward system or stored in read only memory for use in speech synthesizers of the type that will be described. As shown in the flow chart of FIG. 6, control processor 435 is conditioned by a manual signal ST from a switch or other device (not shown) to enable the operation of the encoder. All of the operations of the digital signal processors of FIG. 4 to generate the predictive parameter signals and the excitation code signals K* and $\gamma^*$ for a time frame interval occur within the time frame interval. When the on switch has been set (step 601), signal ST is produced to enable predictive coefficients processor 405 and the instructions in common program store 430 are accessed to control the operation of processor 405. Speech applied to microphone 401 is filtered and sampled in filter and sampler 403 and converted to a sequence of digital signals in A/D converter 404. Processor 405 receives the digitally coded sample signals from converter 404, partitions the samples into time frame segments as they are received and stores the successive frame samples in data memory 408 as indicated in step 705 of FIG. 7. Short delay coefficient signals a(k) and perceptually weighted short delay signals b(k) are produced in accordance with aforementioned U.S. Pat. No. 4,133,476 and equation 19 for the current time frame as per step 71. The current frame predictive residual signal $\partial(n)$ are generated in accordance with equation 20 from the current frame speech samples s(n) and the LPC coefficient signals a(k) in step 715. When the operations of step 715 are completed, an end of short delay analysis signal is sent to control processor 435 (step 720). The STELPC signal is used to start the operations of processor 410 as per step 615 of FIG. 6. Long delay coefficient signals $\beta(1)$, $\beta(2)$, $\beta(3)$ and m ae then formed according to equations 21 and 22 as per step 725, and an end of the predictive coefficient analysis signal STEPCA is generated (step 730). Processor 405 may be adapted to form the predictive coefficient signals as described in the aforementioned patent 4,133,976 The signals a(k), b(k), $\beta(n)$, and $\beta(n)$ and m of the current speech frame are transferred to common data memory 450 for use in residual signal processing.

Figure 8:
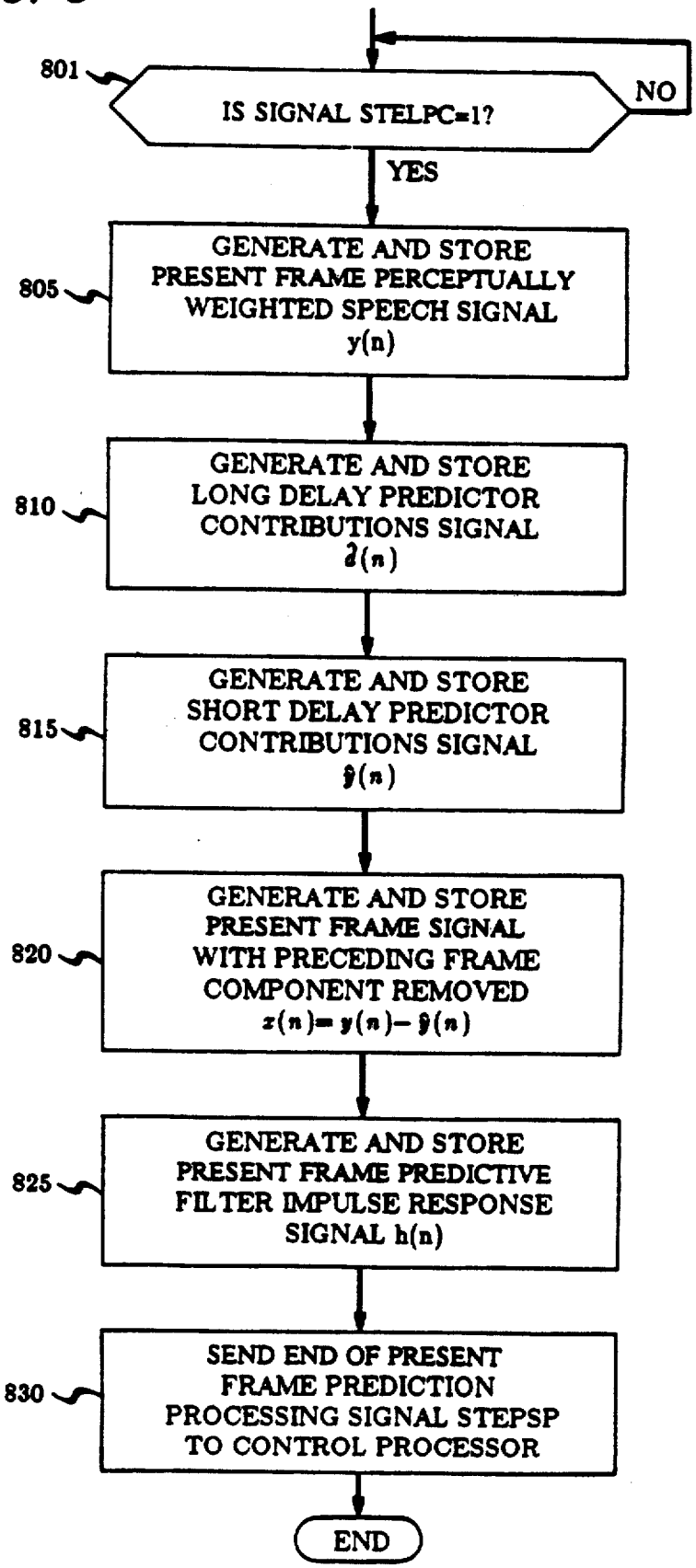

When the current frame LPC coefficient signals have been generated in processor 405, control processor 435 is responsive to the STELPC signal to activate prediction residual signal processor 410 by means of step 801 in FIG. 8. The operations of processor 410 are done under control of common program store 430 as illustrated in the flow chart of FIG. 8. Referring to FIG. 8, the formation and storage of the current frame perceptually weighted signal y(n) is accomplished in step 805 according to equation 23. Long delay predictor contribution signals $\partial(n)$ are generated as per equation 24 in step 810. Short delay predictor contributions signal y(n) is produced in step 815 as per equation 24. The current frame speech pattern signal with preceding frame components removed (x(n)), is produced by subtracting signal y(n) from signal y(n) in step 820 and impulse response signal h(n) is formed from the LPC coefficient signals a(k) as described in aforementioned U.S. Pat. No. 4,133,476 (step 825). Signals x(n) and h(n) transferred to and stored in common data memory 450 for use in transform signal processor 415.

Figure 9:
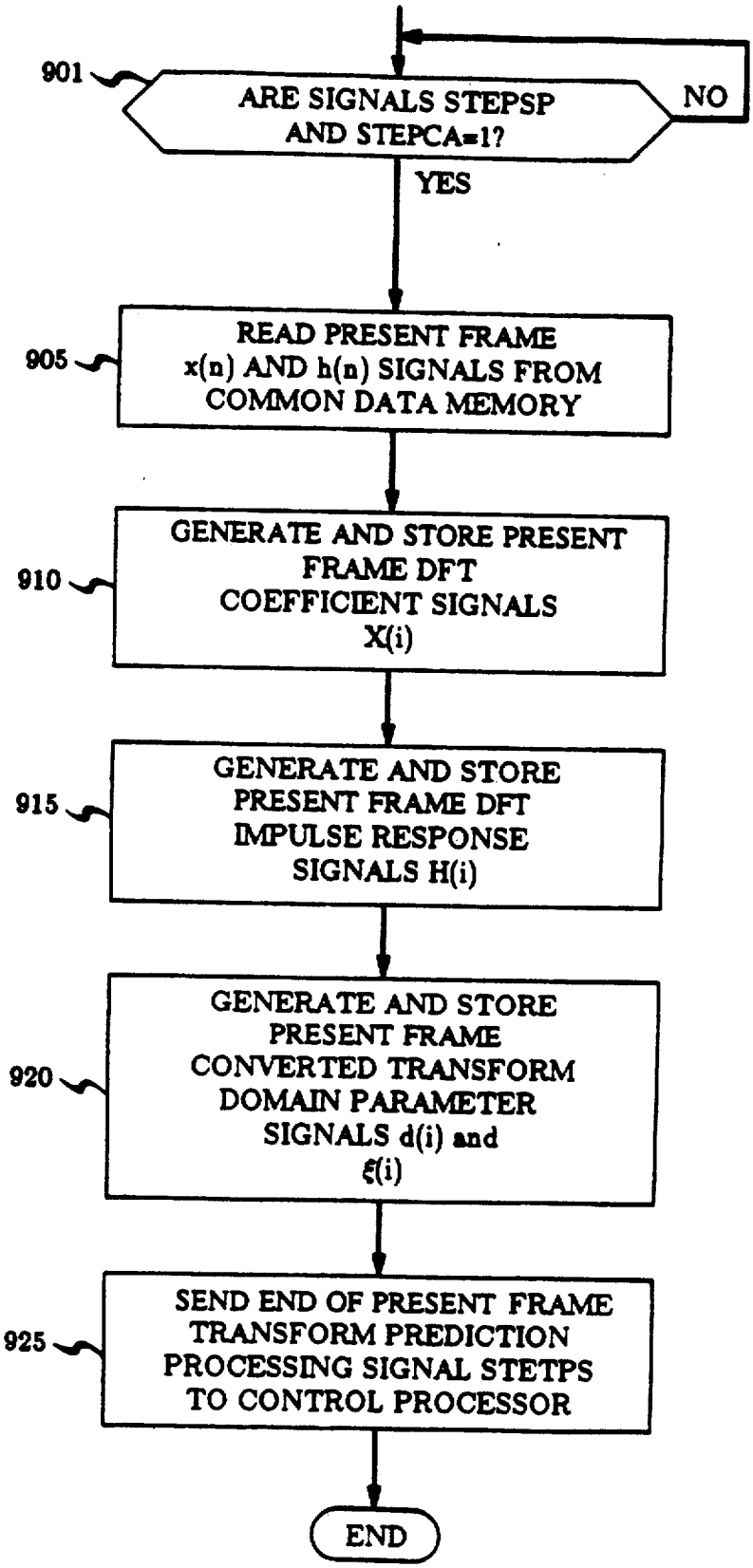

Upon completion of the generation of signals x(n), h(n) for the current time frame, control processor 435 receives signal STEPSP from processor 410. When both signals STEPSP and SEPTCA are received by control processor 435 (step 621 of FIG. 6), the operation of transform signal processor 415 is started by transmitting the STEPSP signal to processor 415 as per step 625 in FIG. 6. Processor 415 is operative to generate the frequency domain speech frame representative signals x(i) and H(i) by performing a discrete Fourier transform operation on signals x(n) and h(n). Referring to FIG. 9, upon detecting signal STEPSP (step 901), the x(n) and h(n) signals are read from common data memory 450 (step 905). Signals X(i) are generated from the x(n) signals (step 910) and signals H(i) are generated from the h(n) signals (step 915) by Fourier transform operations well known in the art. The DFT may be implemented in accordance with the principles described in aforementioned U.S. Pat. No. 3,588,460. The conversion of signals X(i) and H(i) into the speech frame representative signals d(i) and $\xi(i)$ implemented in processor 415 is done in step 920 as per equation 29 and signals d(i) and $\xi(i)$ are stored in common data memory 450. At the end of the current frame transform prediction processing, signals STETPS is sent to control processor 435 (step 925). Responsive to signal STETPS in step 630, the control processor enables the error and scale factor signal processors 420-1 through 420-R (step 635).

Figure 10:
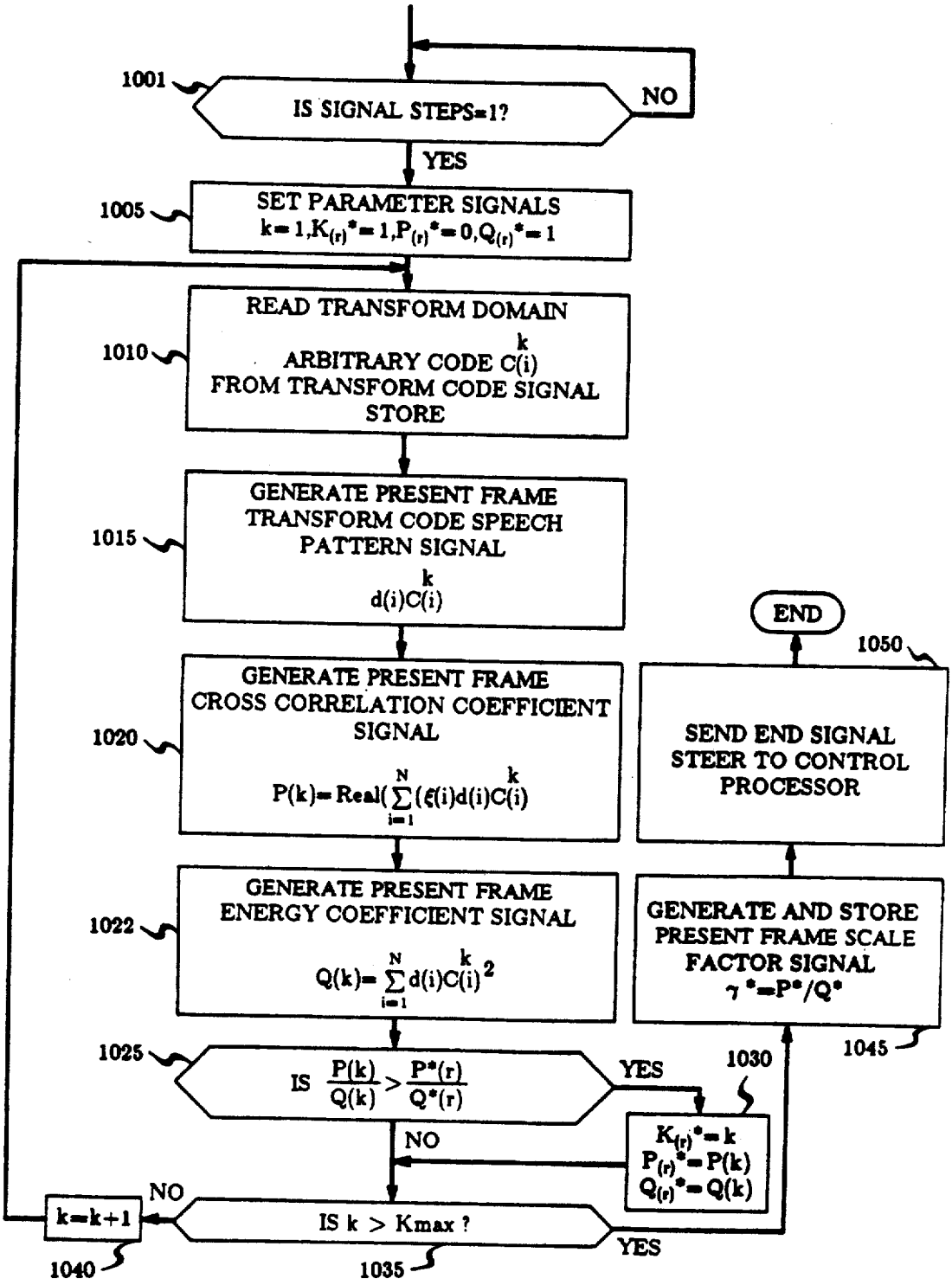

Once the transform domain time frame speech representative signals for the current frame have been formed in processor 415 and stored in common data memory 450, the search operations for the stochastic code $$c_{(n)}^{K^*}$$

that best matches the current frame speech pattern is performed in error and scale factor signal processors 420-1 through 420-K. Each processor generates error and scale factor signals corresponding to one or more (e.g., 100) transform domain codes in store 445. The error and scale factor signal formation is illustrated in the flow chart of FIG. 10. In FIG. 10, the presence of control signal STETPS (step 1001) permits the initial setting of parameters k identifying the stochastic code being processing, K* identifying the selected stochastic code for the current frame, P(r)* identifying the cross correlation coefficient signal of the selected code for the current frame, and Q(r)* identifying the energy coefficient signal of the selected code for the current frame.

The currently considered transform domain arbitrary code $C^{(k)}(i)$ is read from transform code signal store 445 (step 1005) and the current frame transform domain speech pattern signal obtained from the transform domain arbitrary code $C^k(i)$ is formed (step 1015) from the d(i) and $C^k(i)$ signals. The signal $d(i)C^{(k)}(i)$ represents the speech pattern of the frame produced by the arbitrary code $$c_{(n)}^{k}.$$

In effect, code signal $C^{(k)}(i)$ corresponds to the frame excitation and signal d(i) corresponds to the predictive filter representative of the human vocal apparatus. Signal $\xi(i)$ stored in common data store 450 is representative of the current frame speech pattern obtained from microphone 401.

The two transform domain speech pattern representative signals, $d(i)C^{(k)}(i)$ and $\xi(i)$, are cross correlated to formed signal P(k) in step 1020 and an energy coefficient signal Q(k) is formed in step 1022 for normalization purposes. The current deviation of the stochastic code frame speech pattern from the actual speech pattern of the frame is evaluated in step 1025. If the error between the code pattern and the actual pattern is less than the best obtained for preceding codes in the evaluation, index signal K(r)*, cross correlation signal P(r)* and energy coefficient signal Q(r)* are set to k, P(k), and Q(k) in step 1030. Step 1035 is then entered to determine if all codes have been evaluated. Otherwise, signals K(r)*, P(r)*, and Q(r)* remain unaltered and step 1035 is entered directly from step 1025. Until K>Kmax in tep 1035, code index signal k is incremented (step 1040) and step 1010 is reentered. When k > Kmax, signal K(r)* is stored and scale factor signal γ* is generated in step 1045. The index signal K(r)* and scale factor signal γ(r)* for the codes processed in the error and scale factor signal processor are stored in common data store 450. Step 1050 is then entered and the STEER control signal is sent to control processor 435 to signal the completion of the transform code selection in the error and scale factor signal processor (step 640 in FIG. 6). The control processor is then operative to enable the minimum error and multiplex processor 455 as per step 645.

Figure 11:
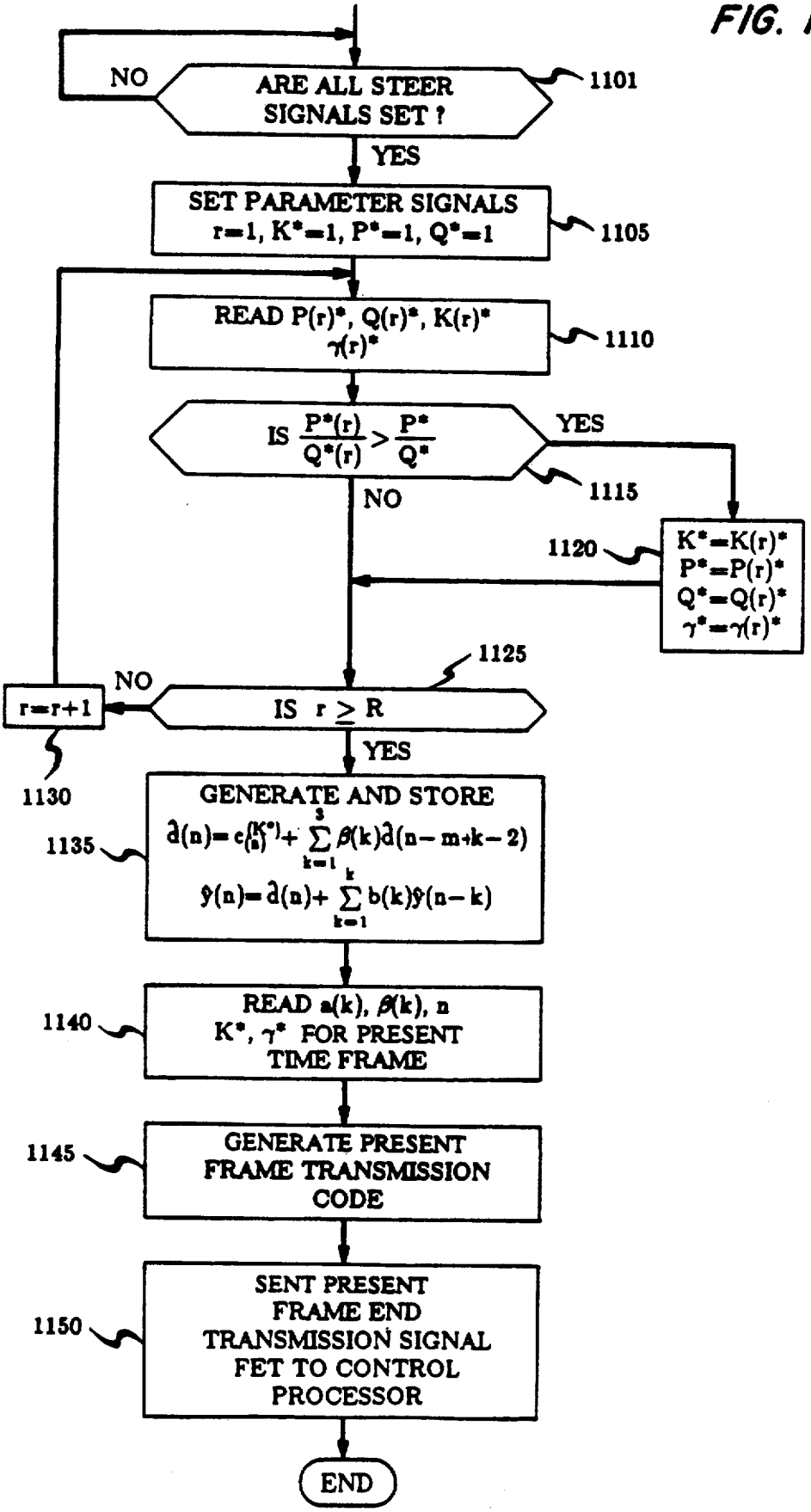

The signals P(r)*, Q(r)*, and K(r)* resulting from the evaluation in processors 420-1 through 420-R are stored in common data memory 450 and are sent to minimum error and multiplex processor 455. Processor 455 is operative according to the flow chart of FIG. 11 to select the best matching stochastic code in store 440 having index K*. This index is selected from the best arbitrary codes indexed by signals K*(1) through K*(R) for processors 420-1 to 420-R. This index K* corresponds to the stochastic code that results in the minimum error signal. As per step 1101 of FIG. 11, processor 455 is enabled when a signal is received from control processor 435 indicating that processors 420-1 through 420-R have sent STEER signals. Signals r, K*, P*, and Q* are each set to an initial value of one, and signals P(r)*, Q(r)*, K(r)* and γ(r)* are read from common data memory 450 (step 1110). If the current signals P(r)* and Q(r)* result in a better matching stochastic code signal as determined in step 1115, these values are stored as K*, P*, Q*, and γ* for the current frame (step 1120) and decision step 1125 is entered. Until the Rth set of signals K(R)*, P(R)*, Q(R)* are processed, step 1110 is reentered via incrementing step 1130 so that all possible candidates for the best stochastic code are considered. After the Rth set of signals are processed, signal K*, the selected index of the current frame and signal γ*, the corresponding scale factor signal are stored in common data memory 450.

At this point, all signals to form the current time frame speech code are available in common data memory 450. The contribution of the current frame excitation code $$c_{(n)}^{K^*}$$

must be generated for use in signal processor 440 in the succeeding time frame interval to remove the preceding frame component of the current time frame for forming signal x(n) as aforementioned. This is done in step 1135 where signals d(n) and y(n) are updated.

The predictive parameter signals for the current frame and signals K* and γ* are then read from memory 450 (step 1140), and the signals are converted into a frame transmission code set as is well known in the art (step 1145). The current frame end transmission signal FET is then generated and sent to control processor 435 to signal the beginning of the succeeding frame processing (step 650 in FIG. 6).

When use in a communication system, the coded speech signal of the time frame comprises a set of LPC coefficient a(k), a set of pitch predictive coefficients β(1), β(2), β(3), and m, and the stochastic code index and scale factor signals K* and γ*. As is well known in the art, a predictive decoder circuit is operative to pass the excitation signal of each speech time frame through one or more filters that are representative of a model of the human vocal apparatus. In accordance with an aspect of the invention, the excitation signal is an arbitrary code stored therein which is indexed as described with respect to the speech encoder of the circuits of FIGS. 2 and 3 or FIG. 4. The stochastic codes may be a set of 1024 codes each comprising a set of 40 random numbers obtained from a string of the 1024 random number codes g(1), g(2), . . . ,g(1063) stored in a register. The 40 element stochastic codes are arranged in overlapping fashion as illustrated in Table 1.

TABLE I

| Stochastic Code Index K | Stochastic Code |
|---|---|
| 1 | g(1), g(2), . . . , g(40) |
| 2 | g(2), g(3), . . . , g(41) |
| 3 | g(3), g(4), . . . , g(42) |
| 4 | g(4), g(5), . . . , g(43) |
| 4 | g(4), g(5), . . . , g(43) |
| 4 | g(4), g(5), . . . , g(43) |
| 1024 | g(1024), g(1025, . . . , g(1063) |

Referring to Table 1, each code is a sequence of 40 random numbers that are overlapped so that each successive code begins at the second number position of the preceding code. The first entry in Table 1 includes this indes k = 1 and the first 40 random numbers of the single string g(1), g(2), . . . . g(40). The second code with index k = 2, corresponds to the set of random numbers g(2), g(3), . . . , g(41). Thus, 39 positions of successive codes are overlapped without affecting their random character to minimize storage requirements. The degree of overlap may be varied without affecting the operation of the circuit. The overall average of the string signals g(1) through g(1063) must be relatively small. The arbitrary codes need not be random numbers and the codes need not be arranged in overlapped fashion. Thus, arbitrary sequences of +1, −1 that define a set of unique codes may be used.

Figure 12:
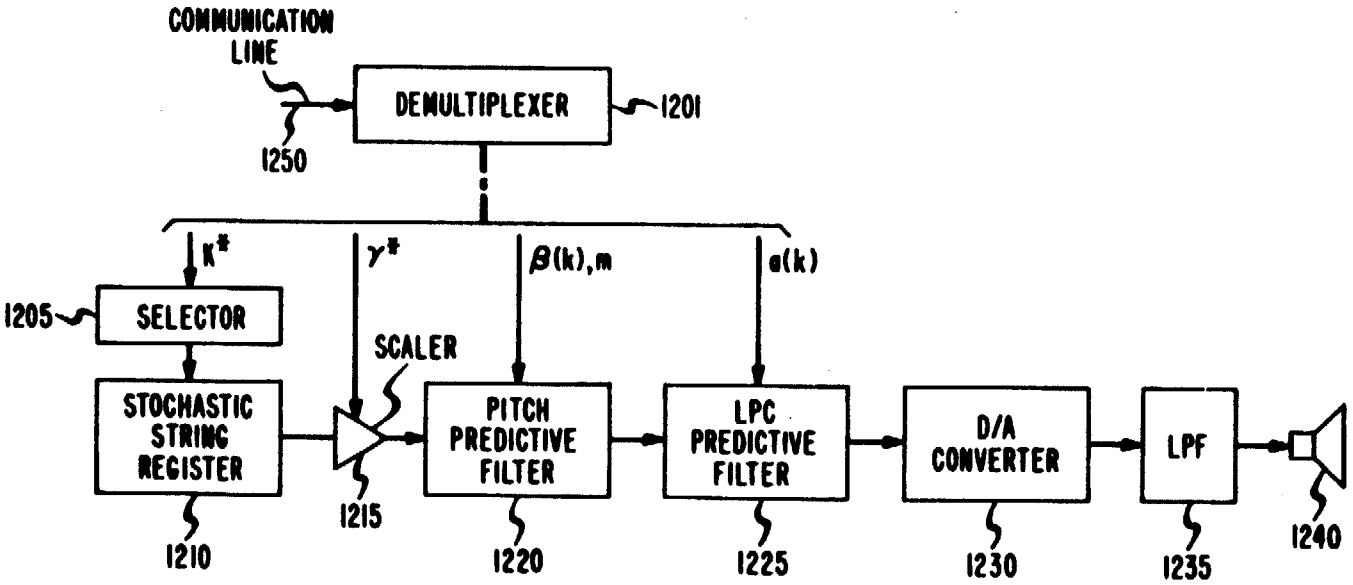
FIG. 12 shows a block diagram of a speech decoder circuit illustrative of the invention in which a string of random number codes form an overlapping sequence of stochastic codes.

In the decoder or synthesizer circuit of FIG. 12, LPC coefficient signals a(k), pitch predictive coefficient signals β(1), β(2), β(3), and m, and the stochastic code index and scale factor signals K* and γ* are separated in demultiplexer 1201. The pitch predictive parameter signals β(k) and m are applied to pitch predictive filter 1220, and the LPC coefficient signals are supplied to LPC predictive filter 1225. Filters 1220 and 1225 operate as is well known in the art and as described in the aforementioned U.S. Pat. No. 4,133,976 to modify the excitation signal from scaler 1215 in accordance with vocal apparatus features. Index signal K* is applied to selector 1205 which addresses stochastic string register 1210. Responsive to index signal K*, the stochastic code best representative of the speech time frame excitation is applied to scaler 1215. The stochastic codes correspond to time frame speech patterns without regard to the intensity of the actual speech. The scaler modifies the stochastic code in accordance with the intensity of the excitation of the speech frame. The formation of the excitation signal in this manner minimizes the excitation bit rate required for transmission, and the overlapped code storage operates to reduce the circuit requirements of the decoder and permits a wide selection of encryption techniques. After the stochastic code excitation signal from scaler 1215 is modified in predictive filters 1220 and 1225, the resulting digital coded speech is applied to digital-to-analog converter 1230 wherein successive analog samples are formed. These samples are filtered in low pass filter 1235 to produce a replica of the time frame speech signal s(n) applied to the encoder of the circuit of FIGS. 2 and 3 of FIG. 4.

The invention may be utilized in speech synthesis wherein speech patterns are encoded using stochastic coding as shown in the circuits of FIGS. 2 and 3 or FIG. 4. The speech synthesizer comprises the circuit of FIG. 12 in which index signals K* are successively applied from well known data processing apparatus together with predictive parameter signals in accordance with the speech pattern to be produced. The overlapping code arrangement minimizes the storage requirements so a wide variety of speech sounds may be produced and the stochastic codes are accessed with index signals in a highly efficient manner. Similarly, storage of speech messages according to the invention for later reproduction only requires the storage of the predictive parameters and the excitation index signals of the successive frames so that speech compression is enhanced without reducing the intelligibility of the reproduced message.

While the invention has been described with respect to particular embodiments thereof, it is to be understood that various changes and modifications may be made by those skilled in the art without departing from the spirit or scope of the invention.

What is claimed is:

1. Apparatus for encoding speech comprising means (330) for storing a set of signals each representative of a random code and a set of index signals each identifying one of the random codes;

means (203 through 247 except 225 and 245) for partitioning the speech into successive time frame interval portions and for forming a time-domain signal representative of the portion of speech in each successive time frame interval;

means (225, 245, 250) for generating at least one transform domain signal from each such time-domain signal;

means (305) responsive to each random code signal for generating a transform domain code signal corresponding thereto, via the same type of transformation as in the aforesaid means for generating a transform domain signal;

means (315 and 320, or 501 through 520 and 320) for cross-correlating transform domain signals for each time frame interval with each of said transform domain code signals to select one of the transform domain code signals as yielding minimum error or maximum similarity as a representative of the speech portion in the time-frame interval; and means (325) for outputting the index signal corresponding to the random code signal corresponding to the selected transform domain code signal.

2. Apparatus for encoding speech of the type claimed in claim 1 in which the means for forming a time domain signal comprises means for forming said signal as representative of the predictive parameters of the portion of speech in each successive time frame interval;

the means for generating at least one trnsform domain signal comprises means for generating a transform domain signal representative of the predictive parameters from said time domain signal representative of the predictive parameters; and the means for generating at least one transform domain signal further comprises means (225, 245) for generating a transform domain signal representative of predictive characteristics for said portion of speech;

the means for cross-correlating includes means responsive to the predictive characteristics representative signal for forming a signal ($\gamma$) representative of the relative scaling of the transform domain code signal with respect to a transform domain signal representative of the predictive parameters for each time frame interval; and the outputting means comprises means for outputting the relative scaling signal and the signal representative of the predictive parameters.

3. Apparatus for encoding speech of the type claimed in claim 2, in which the means for forming a time domain signal as representative of the portion of speech in each successive time frame interval comprises means (209, 213, 215) for generating a set of signals representative of the predictive parameters of the speech in each successive time frame interval;

means (207, 211) for forming a signal representative of the predictive residual for the speech in each successive time frame interval; and means (217, 227, 222, 235, 240, 247) responsive to the predictive residual generating means and to the predictive parameter signal generating means for removing the contribution attributable to speech from the previous time frame.

4. Apparatus for encoding speech of the type claimed in claim 3, in which the means for partitioning and forming a time domain signal, further includes means (220, 230), responsive to the predictive residual generating means, for producing pitch predictive parameters including contributions of previous frames; and the combining means of the outputting means is responsive to said means for producing pitch predictive parameters.

5. Apparatus for encoding speech of the type claimed in either of claims 2 or 3 in which the cross-correlating means comprises means (501) for cross-correlating all three of said predictive-parameter-representative transform domain signal, said transform domain signal representative of the relative scaling for the portion of speech, and said transform domain code signal;

means (505, 510, 515, 520) responsive to the output of the means for cross-correlating specifically and to one or more of the three signals for producing the relative scaling signal ($\gamma$) and for producing a cross-correlation error signal ($E_{(k)}$).

6. Apparatus for encoding speech comprising means (330) for storing a set of signals each representative of a random code and set of index signals each identifying one of the random codes;

means (203 through 247 except 225 and 245) for partitioning the speech into successive time frame interval portions and for forming a time-domain signal representative of the portion of speech in each successive time frame interval;

means (225, 245, 250) for generating at least one transform domain signal from each such time-domain signal;

means (305) responsive to each random code signal for generating a transform domain code signal corresponding thereto, via the same type of transformation as in the aforesaid means for generating a transform domain signal;

means (315 and 320 or 501 through 520 and 320) for responding in a comparative fashion to transform domain signals for each time frame interval and, for each such signal, to each of said transform domain code signals to select one of the transform domain code signals as yielding minimum error or maximum similarity as a representative of the speech portion in the time frame interval; and means (325) for outputting the index signal corresponding to the random code signal corresponding to the selected transform domain code signal.

7. A method for encoding speech comprising the steps of storing a set of signals each representative of a random code and a set of index signals each identifying one of the random codes;

partitioning the speech into successive time frame interval portions;

forming a time-domain signal representative of the portion of speech in each successive time frame interval;

generating at least one transform domain signal from each such time-domain signal;

generating a transform domain code signal responsive to each random code signal, via the same type of transformation as in the aforesaid steps of generating a transform domain signal;

cross-correlating transform domain signals for each time frame interval with each of said transform domain code signals to select one of the transform domain code signals as yielding minimum error or maximum similarly as a representative of the speech portion in the time-frame interval; and outputting the index signal corresponding to the random code signal corresponding to the selected transform domain code signal.

8. A method for encoding speech of the type claimed in claim 7 in which the step of forming a time domain signal comprises the step of forming said signal as representative of the predictive parameters of the portion of speech in each successive time frame interval;

the step of generating at least one transform domain signal comprises generating a transform domain signal representative of the predictive parameter from said time domain signal representative of the predictive parameters; and the step of generating at least one transform domain signal further comprises step of generating a transform domain signal representative of predictive characteristics for said portion of speech;

the step of cross-correlating includes the step of forming a signal ($\gamma$) representative of the relative scaling of the transform domain code signal with respect to a transform domain signal representative of the predictive parameters for each time frame interval in response to the representative signal representative of the energy predictive characteristics; and the outputting means comprises means for outputting the relative scaling signal and the signal representative of the predictive parameters.

9. A method for encoding speech of the type claimed in claim 8, in which the step of forming a time domain signal as representative of the pattern of the portion of speech in each successive time frame interval comprises generating a set of signals representative of the predictive parameters of the speech in each successive time frame interval;

forming a signal representative of the predictive residual for the speech in each successive time frame interval; and removing the contribution attributable to speech from the previous time frame in response to the predictive residual generating means and to the predictive parameter signal generating means.

10. Apparatus for encoding speech of the type claimed in claim 9, in which the partitioning step and the step of forming a time domain signal includes producing pitch predictive parameters including contributions of previous frames in response to the predictive residual representative signal; and the combining step also combines said pitch predictive parameters.

11. A method for encoding speech of the type claimed in either of claims 8 or 9 in which the cross-correlating step comprises specifically cross-correlating all three of said predictive-parameter-representative transform domain signal, said transform domain signal representative of the relative scaling for the portion of speech, and said transform domain code signal;

applying the output of the specifically cross-correlating step and one or more of the three signals to produce the relative scaling signal ($\gamma$) and a cross-correlation error signal ($E_{(k)}$).

12. A method for encoding speech comprising storing a set of signals each representative of a random code and a set of index signals each identifying one of the random codes;

partitioning the speech into successive time frame interval portions;

forming a time-domain signal representative of the portion of speech in each successive time frame interval;

generating at least one transform domain signal from each such time-domain signal;

generating a transform domain code signal responsive to each random code signal via the same type of transformation as in the aforesaid step of generating a transform domain signal;

responding in a comparative fashion to transform domain signals for each time frame interval and, for each such signal, to each of said transform domain code signals to select one of the transform domain code signals as yielding minimum error or maximum similarity as a representative of the speech portion in the time frame interval; and outputting the index signal corresponding to the random code signal corresponding to the selected transform.

13. Apparatus for providing a speech message comprising means for receiving a sequence of speech message signals for the successive time intervals of the speech message, each time interval speech message signal including a set of transform-domain-coded signals representative of the time interval portion of the speech message, at least a portion of which are index signals corresponding to a known set of random codes means for storing said known set of random codes in one-for-one association with the corresponding index signals means for generating said random codes for each of the set of index signals, and means for controlling speech wave generation for said time interval in response to said generated random codes.

14. Apparatus of the type claimed in claim 13 in which the storing means comprises means for storing the random codes sequentially so that a first portion of each succeeding one is derived from the latter portion of the preceding one.

15. A method for producing a speech message comprising receiving a sequence of speech message signals for the successive time intervals of the speech message, each time interval speech message signal including a set of transform-domain-coded signals representative of the time interval portion of the speech message, at least a portion of which are index signals corresponding to a known set of random codes;

storing said known set of random codes in one-for-one association with the corresponding index signals;

generating said codes sequentially for each of the set of index signals;

and controlling speech wave generation for said time interval in response to said sequentially generated random codes.

*16. Apparatus for processing input speech signals occurring over one or more successive time frame intervals comprising*

*means (e.g., 203, 205) for forming first signals representative of said speech signals for each of said time frame intervals,*

*means (e.g., 305) for providing a set of transform domain representations of a corresponding set of codes each of said codes being representative of possible speech signals over a time frame interval, and for providing a set of index signals, each identifying one of said codes,*

*means (e.g., 315) for generating a set of similarity signals corresponding to the similarity of said first signals to each of said set of transform domain representations,*

*means (e.g., 320) for generating index signals corresponding to codes having transform domain representations giving rise to similarity signals meeting a predetermined criterion.*

*17. Apparatus according to claim 16, wherein said means for forming first signals comprises means (e.g., 215) for forming a perceptually weighted representation of said input speech signals.*

*18. Apparatus according to claim 16, wherein said means for providing a set of transform domain representations comprises memory means (e.g., 305) for storing a set of transform domain signals.*

*19. Apparatus according to claim 16, wherein said means for forming first signals comprises means (e.g., 207, 209, 211, 215, 217, 222, 227, 240 and 247) for reducing for each time frame interval any contribution to said first signal arising from speech signals occurring during another time frame interval.*

*20. The method of processing input speech signals occurring over one or more successive time frame intervals comprising*

*forming first signals representative of said speech signals for each of said time frame intervals,*

*providing a set of transform domain representations of a corresponding set of codes each of said codes being representative of possible speech signals over a time frame interval, and for providing a set of index signals, each identifying one of said codes,*

*generating a set of similarity signals corresponding to the similarity of said first signals to each of said set of transform domain representations,*

*generating index signals corresponding to codes having transform domain representations giving rise to similarity signals meeting a predetermined criterion.*

*21. The method according to claim 20, wherein said step of forming first signals comprises forming a perceptually weighted representation of said input speech signals.*

*22. The method according to claim 20, wherein said step of providing a set of transform domain representations comprises accessing a set of stored transform domain signals.*

*23. The method according to claim 20, wherein said forming first signals comprises reducing for each time frame interval any contribution to said first signal arising from speech signals occurring during another time frame interval.*

* * * * *

UNITED STATES PATENT AND TRADEMARK OFFICE

CERTIFICATE OF CORRECTION

PATENT NO. : Re. 34,247

DATED : May 11, 1993

INVENTOR(S) : Bishnu S. Atal, Isabel M. Martins Trancoso

It is certified that error appears in the above-identified patent and that said Letters Patent is hereby corrected as shown below:

In the claims:

Claim 10; column 20; line 11: "Apparatus" should read --A method--

Signed and Sealed this

Eleventh Day of July, 1995

Bruce Lehman

*Attest:*

BRUCE LEHMAN

*Attesting Officer*

*Commissioner of Patents and Trademarks*